United States Patent [19]
Etzbach et al.

[11] Patent Number: 6,136,251
[45] Date of Patent: Oct. 24, 2000

[54] PROCESS FOR PRODUCING PIGMENT PARTICLES OF DEFINED SHAPE AND SIZE

[75] Inventors: Karl-Heinz Etzbach, Frankenthal; Harald Keller; Reinhold Leyrer, both of Ludwigshafen; Tillmann Faust, Weisenheim; Peter Schuhmacher, Mannheim; Karl Siemensmeyer, Frankenthal, all of Germany

[73] Assignee: BASF Aktiengesellschaft, Ludwigshafen, Germany

[21] Appl. No.: 09/147,855

[22] PCT Filed: Sep. 9, 1997

[86] PCT No.: PCT/EP97/04906

§ 371 Date: Mar. 22, 1999

§ 102(e) Date: Mar. 22, 1999

[87] PCT Pub. No.: WO98/12265

PCT Pub. Date: Mar. 26, 1998

[30] Foreign Application Priority Data

Sep. 20, 1996 [DE] Germany .................. 196 38 797

[51] Int. Cl.⁷ .................................................. B29B 9/10
[52] U.S. Cl. .............................................. 264/297.8
[58] Field of Search ..................... 264/5, 297.8, 140

[56] References Cited

U.S. PATENT DOCUMENTS

| | | | |
|---|---|---|---|
| 4,427,413 | 1/1984 | Bauerle | 8/471 |
| 5,079,365 | 1/1992 | Sens et al. | 546/119 |
| 5,283,326 | 2/1994 | Hansen et al. | 534/766 |
| 5,302,654 | 4/1994 | Ishii et al. | 524/458 |
| 5,364,557 | 11/1994 | Faris | 252/299.01 |
| 5,580,980 | 12/1996 | Etzbach et al. | 544/105 |
| 5,780,629 | 7/1998 | Etzbach | 544/296 |

FOREIGN PATENT DOCUMENTS

| | | |
|---|---|---|
| 0 083 553 | 12/1982 | European Pat. Off. . |
| 0 201 896 | 12/1986 | European Pat. Off. . |
| 0 542 669 | 5/1993 | European Pat. Off. . |
| 0 542 669 A1 | 5/1993 | European Pat. Off. . |
| 35 26 102 | 5/1986 | Germany . |
| 43 42 280 A1 | 6/1995 | Germany . |
| 44 18 075 | 11/1995 | Germany . |
| 56-040 512 | 4/1981 | Japan . |
| WO 92/19684 | 11/1992 | WIPO . |
| WO 96 02597 A1 | 1/1996 | WIPO . |
| WO 96/02597 | 2/1996 | WIPO . |
| WO 97 27251 A1 | 7/1997 | WIPO . |
| WO 97/27251 | 7/1997 | WIPO . |

OTHER PUBLICATIONS

K. Venkataraman, "The Chemistry of Synthetic Dyes", vol. VI, Academic Press, New York, London, 1972, pp. 213–297.

L.Shettleworth, et al., Edited by David R. Waring and Geoffrey Hallas, "The Chemistry and Application of Dyes", pp. 107–118, Plenum Press, New York, London, 1990.

Ullmann's Encyclopaedie der technischen Chemie, 4 th edition, vol. 17. p. 469.

*Primary Examiner*—Mary Lynn Theisen
*Attorney, Agent, or Firm*—Oblon, Spivak, McClelland, Maier & Neustadt, P.C.

[57] ABSTRACT

A process for preparing pigment particles of defined size and shape comprises treating a sheetlike structure having through openings of defined shape and size with a polymerizable substance or mixture of substances in such a way that the openings are filled, removing any solvent present, polymerizing the substance or substance mixture, and isolating the resulting pigment particles from the openings. The pigments are readily varied in size and shape by variation of the substrate parameters and are useful for the known pigment applications, especially coatings, paints and inks.

8 Claims, No Drawings

PROCESS FOR PRODUCING PIGMENT PARTICLES OF DEFINED SHAPE AND SIZE

DESCRIPTION

This invention relates to a process for preparing pigment particles of defined size and shape by treating a sheetlike structure having through openings of defined shape and size with a polymerizable substance or mixture of substances in such a way that the openings are filled, removing any solvent present, polymerizing the substance or substance mixture, and isolating the resulting pigment particles from the openings.

Pigments are customarily prepared by precipitation reactions or by mechanical comminution of larger colored species. These methods of pigment preparation give rise to pigment particles differing in shape and size.

Prior German Patent Applications 19532419.6 and 19602795.0 describe processes for preparing pigments having a cholesteric liquid crystalline order structure by printing processes. This process makes it possible to obtain pigment particles of uniform shape.

To manufacture high quality pigment coatings, especially those with interference based color effects, it is advantageous to use pigment particles of defined uniform shape and size. However, obtaining a suitable thickness by printing is prohibitively complicated.

It is an object of the present invention to provide a process for preparing pigment particles of defined shape and size where the thickness is easily adjusted.

We have found that this object is achieved by the process of this invention.

Suitable sheetlike structures having through openings preferably include flexible structures such as wovens and especially nets. The sheetlike structures can be formed for example from natural or synthetic threads or metal wires, specifically from materials such as polyolefins, polyamides, polyesters or fluorinated polyolefins and wires composed of in particular stainless steel, for example.

Particularly suitable sheetlike structures are nets suitable for screen printing for example.

The mesh size determines the geometry of the pigment particles to be prepared, the size of these particles being advantageously within the range from 15 to 200 $\mu$m edge length, preferably within the range from 20 to 100 $\mu$m edge length.

The treatment of the sheetlike structures with the polymerizable substances can be effected for example by dipping, knife coating or saturating and squeezing off. It is also possible to apply the polymerizable mixture to a support, for example a continuously circulating smooth support film, and then transfer it to a continuously circulating netlike film. The voids in the net and the polymerizable mixture become filled [sic]. It can be advantageous in this connection to provide the sheetlike structures ahead of this treatment with agents which facilitate ready separation of the pigment particles from the substrate. Such agents include for example polyvinylpyrrolidones, vinylpyrrolidone copolymers, silicones, surface-active substances, long-chain fatty acids or esters or fluorosurfactants. The choice of sheetlike structure also determines the release agents which are most suitable for the specific substrate. The polymerizable substances can be applied as an aqueous dispersion or solution, for example.

It is advantageous to employ readily removable solvents, for example tetrahydrofuran, dioxane, butyrolactone, esters such as methyl acetate, ethyl acetate or butyl acetate, ketones such as cyclohexanone, acetone, methyl ethyl ketone or diethyl ketone or hydrocarbons such as toluene. It is also possible to use halogenated alkanes such as methylene chloride, ethylene chloride, chloroform or carbon tetrachloride.

The removal of the solvent can be effected by evaporation at room temperature or elevated temperature, if necessary under reduced pressure. The temperatures have to be chosen so that unwanted thermal polymerization does not occur.

Substances which can be converted into pigment particles are in particular dyes and liquid crystalline compounds having polymerizable groups, which become pigments on polymerization. However, it is also possible to use dyes or liquid crystalline compounds in combination with polymerizable binders; on polymerization, the dyes or liquid crystalline compounds then become embedded in the polymeric matrix.

The preparative process of this invention starts from polymerizable individual compounds or from a polymerizable mixture. These starting materials can be for example organic or inorganic dyes. Either these dyes are themselves polymerizable, for example through polymerizable side chains on the chromophores, or the dyes are mixed with a polymerizable binder, so that they become encapsulated in a polymeric network. The choice of dye depends on the later use of the pigment. In principle, any dye can be used in the process of this invention. It is advantageous to use dyes which are either insoluble or which can be incorporated covalently into the polymeric network.

Suitable dyes will now be more particularly described.

Suitable azo dyes are in particular mono- or disazo dyes, for example those having a diazo component derived from an aniline or from a five-membered aromatic heterocyclic amine which contains from one to three hetero atoms selected from the group consisting of nitrogen, oxygen and sulfur in the heterocyclic ring and can be fused with a benzene, thiophene, pyridine or pyrimidine ring.

Important mono- or disazo dyes are for example those whose diazo component is derived for example from an aniline or from a heterocyclic amine of the pyrrole, furan, thiophene, pyrazole, imidazole, oxazole, isoxazole, thiazole, isothiazole, triazole, oxadiazole, thiadiazole, benzofuran, benzothiophene, benzimidazole, benzoxazole, benzothiazole, benzisothiazole, pyridothiophene, pyrimidothiophene, thienothiophene or thienothiazole series.

Of particular suitability are those diazo components which are derived from an aniline or from a heterocyclic amine of the pyrrole, thiophene, pyrazole, thiazole, isothiazole, triazole, thiadiazole, benzothiophene, benzothiazole, benzisothiazole, pyridothiophene, pyrimidothiophene, thienothiophene or thienothiazole series.

Also of importance are azo dyes having a coupling component of the aniline, aminonaphthalene, aminothiazole, diaminopyridine or hydroxypyridone series.

The monoazo dyes are known per se and have been extensively described, for example in K. Venkataraman, The Chemistry of Synthetic Dyes, Vol. VI, Academic Press, New York, London, 1972, or in EP-A-201 896.

Anthraquinone, coumarin, methine and azamethine and also quinophthalone dyes can also be used with advantage.

Suitable anthraquinone dyes are described for example in D. R. Waring, G. Hallas, The Chemistry and Application of Dyes, pages 107 to 118, Plenum Press, New York, London, 1990.

Suitable coumarin dyes are described for example in Ullmann's Encyklopädie der technischen Chemie, 4th edition, Volume 17, page 469.

Suitable methine or azamethine dyes are described for example in U.S. Pat. No. 5,079,365 and WO-A-9219684.

Suitable quinophthalone dyes are described for example in EP-83 553.

Polymerization means any type of reaction to build up polymers, ie. addition polymerizations in the form of chain reactions, addition polymerizations in the form of stage reactions and also condensation polymerizations.

As well as the dyes or interference colorants, the polymerizable mixture can comprise various customary coating or printing ink additives such as polymerizable binders, reactive diluents, dispersants, polymeric binders, fillers, thinners and also polymerization initiators.

Particularly suitable additives are polymeric binders and/or monomeric compounds which can be converted into a polymeric binder by polymerization. Examples of suitable such agents are organic solvent soluble polyesters, cellulose esters, polyurethanes, silicones and also polyether or polyester modified silicones. Particular preference is given to using cellulose esters such as cellulose acetobutyrate.

Particularly suitable polymerizable substances contain reactive crosslinkable groups such as acryloyl, methacryloyl, α-chloro-acryloyl, vinyl, vinyl ether, epoxy, cyanate, isocyanate or isothiocyanate groups. Monomeric agents are also suitable as binders, especially the reactive diluents well known in paintmaking, for example hexanediol diacrylate or bisphenol A diacrylate. Even small amounts of such substances—usually as little as 0.1–1% by weight—bring about a considerable improvement in the flow viscosity. At the same time these agents have considerable influence on the mechanical properties of the cured pigment particles.

The polymerizable mixtures may further comprise polymerization initiators which decompose either thermally or photochemically and so cause curing to take place. Preferred thermal polymerization initiators are those which decompose within the range from 20 to 180° C., particularly preferably within the range from 50 to 80° C., to initiate the polymerization. In principle, any photoinitiator can be used for photochemical curing. More particularly, mixtures of various initiators can also be used to improve the degree of curing. Examples of highly suitable photoinitiators are benzophenone and its derivatives, such as alkylbenzophenones, halomethylated benzophenones or 4,4'-bis(dimethylamino)benzophenone and also benzoin and benzoin ethers such as ethyl benzoin ether, benzil ketals such as benzil dimethyl ketal, acetophenone derivatives, such as hydroxy-2-methyl-1-phenylpropan-1-one and hydroxycyclohexyl phenyl ketone. Acylphosphine oxides such as 2,4,6-trimethylbenzoyldiphenylphosphine oxide are particularly highly suitable. Among the photochemically activable polymerization initiators, those which do not give rise to yellowing are preferred.

Particularly preferred polymerization initiators also include boron alkyl compounds and peroxides such as dibenzoyl peroxide and di-tert-butyl peroxide.

The photoinitiators which, depending on the intended use for the pigments of this invention, are advantageously used in amounts within the range from 0.01 to 15% by weight, based on the polymerizable components, can be used as individual substances or else—because of advantageous synergistic effects—in combination with each or one another.

Cationic polymerizations are preferably carried out using initiators having charged structures. More particularly, substances are used which are partly used in combination with acylphosphine oxides, for example:

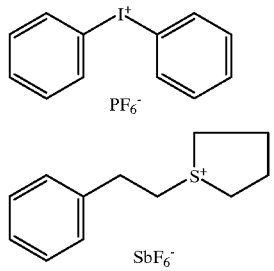

and also derivatives of these compounds.

If desired, the polymerizable mixtures may also comprise stabilizers against UV and weather effects. Suitable for this purpose are for example derivatives of 2,4-dihydroxybenzophenone, derivatives of 2-cyano-3,3-diphenyl acrylate, derivatives of 2,2', 4,4'-tetrahydroxybenzophenone, derivatives of ortho-hydroxyphenylbenzotriazole, salicylic esters, ortho-hydroxyphenyl-s-triazines [sic] or sterically hindered amines. These substances can be used alone or preferably in the form of mixtures.

Examples of contemplated fillers are rutile, anatase, chalk, talc and barium sulfate.

Dispersants have a positive influence on the flow viscosity of the polymerizable mixture and on the miscibility of the individual mixture components. Any commercially available dispersant can be used.

Particularly suitable dispersants are those which are based on a succinic imide, ester or anhydride structure as described in prior German Patent Application 19532419.6.

Contemplated polymerizable compounds also include interference colorants in particular. Since the shape of such interference pigments has to meet particularly high requirements, the process of this invention is particularly suitable for preparing such pigments.

Particularly interesting interference colorants are cholesteric liquid crystalline compositions.

Cholesteric liquid crystalline phases can be composed either of chiral liquid crystalline compounds or of achiral liquid crystalline compounds admixed with suitable chiral dopants.

The cholesteric liquid crystalline compositions used in the preparative process of this invention preferably comprise the following components:

a) at least one chiral liquid crystalline polymerizable monomer or b) at least one achiral liquid crystalline polymerizable monomer and a chiral compound.

Particularly suitable components are in each case those components which can be converted or incorporated into a polymeric network via reactive groups.

Suitable chiral liquid crystalline polymerizable monomers for use as component a) include particularly those of the general formula I

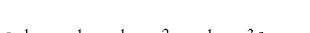

where $Z^1$ is a polymerizable group or a radical bearing a polymerizable group, $Y^1$, $Y^2$ and $Y^3$ are each a chemical bond, oxygen, sulfur, —CO—O—, —O—CO—, —O—CO—O—, —CO—N(R)— or —N(R)—CO—, $A^1$ is a spacer, $M^1$ is a mesogenic group, X is an n-valent chiral radical, R is hydrogen or $C_1$-$C_4$-alkyl, n is from 1 to 6, and the radicals $Z^1$, $Y^1$, $Y^2$, $Y^3$, $A^1$ and $M^1$ can be identical or different.

Preferred radicals $Z^1$ are:

$H_2C=CH—$, $HC\equiv C—$,

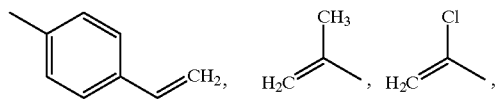

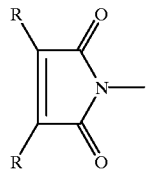

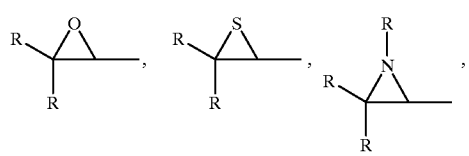

—N=C=O, —N=C=S, —O—C≡N, —COOH, —OH or —NH$_2$, where the radicals R, which can be identical or different, each denote hydrogen or $C^1$-$C^4$-alkyl such as methyl, ethyl, propyl, isopropyl, n-butyl, isobutyl, sec-butyl or tert-butyl. Of the reactive polymerizable groups, the cyanates can trimerize spontaneously to form cyanurates and are therefore preferred. The other groups mentioned require further compounds having complementary reactive groups to polymerize. For instance, isocyanates can polymerize with alcohols to form urethanes and with amines to form urea derivatives. The same is true of thiiranes and aziridines. Carboxyl groups can be condensed to form polyesters and polyamides. The maleiimido group is particularly suitable for free-radical copolymerization with olefinic compounds such as styrene. The complementary reactive groups can be present either in a second compound of this invention, which is mixed with the first, or they can be incorporated into the polymeric network by means of auxiliary compounds containing 2 or more of these complementary groups.

$Y^1$—$Y^3$ each have the meanings mentioned at the outset, of which a chemical bond is to be understood as meaning a single covalent bond.

Particularly preferred groupings $Z^1$—$Y^1$ are acrylate and methacrylate.

Suitable spacers $A^1$ include all groups known for this purpose. Spacers generally contain from 2 to 30, preferably 2 to 12, carbon atoms and consist of linear aliphatic groups. They can be interrupted in the chain, for example by O, S, NH or NCH$_3$, in which case these groups must not be adjacent. Suitable substituents for the spacer chain additionally include fluorine, chlorine, bromine, cyano, methyl and ethyl.

Representative spacers are for example:

—(CH$_2$)$_p$—, —(CH$_2$CH$_2$O)$_m$CH$_2$CH$_2$—, —CH$_2$CH$_2$SCH$_2$CH$_2$—, —CH$_2$CH$_2$NHCH$_2$CH$_2$—,

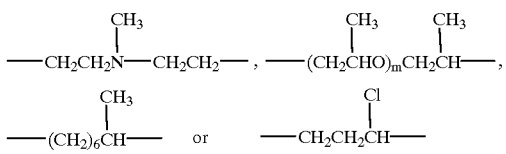

where m is from 1 to 3 and is from 1 to 12.

The mesogenic group $M^1$ preferably has the structure $$(T-Y^8)_s-T$$

where $Y^8$ is a bridge member selected from the definitions for $Y^1$, s is from 1 to 3 and T is identical or different bivalent isocycloaliphatic, heterocycloaliphatic, isoaromatic or heteroaromatic radicals.

The radicals T can also be ring systems substituted by fluorine, chlorine, bromine, cyano, hydroxyl or nitro. Preferred radicals T are:

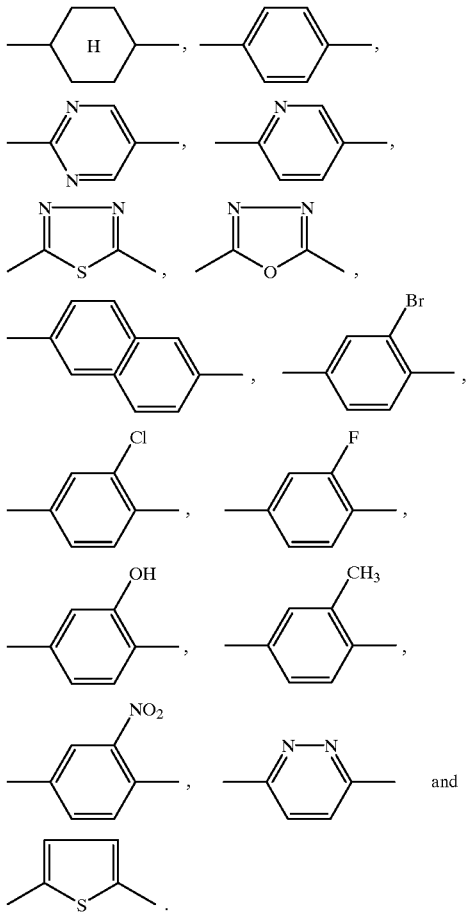

Particular preference is given to the following mesogenic groups $M^1$:

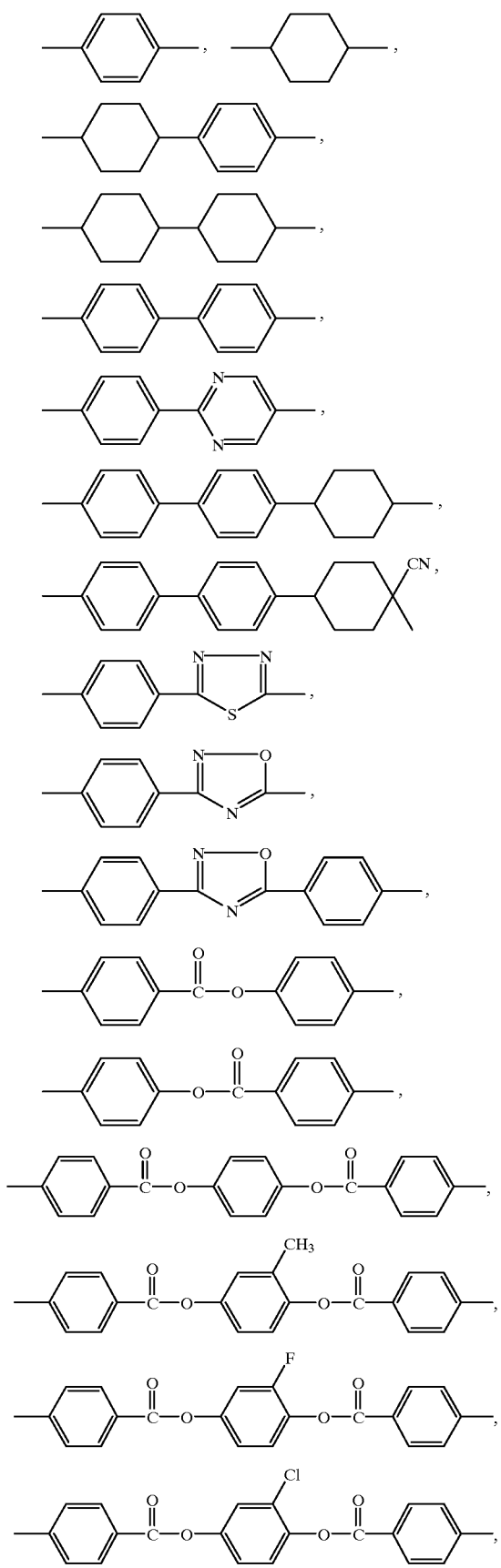

Of the chiral radicals X of the compounds of the general formula I, preference is given, inter alia on grounds of availability, in particular to those which are derived from sugars, binaphthyl or biphenyl derivatives and also optically active glycols, dialcohols or amino acids. Suitable sugars are in particular pentoses and hexoses and derivatives thereof.

Examples of radicals X are the following structures, in which the terminal dashes denote the free valences in each case:

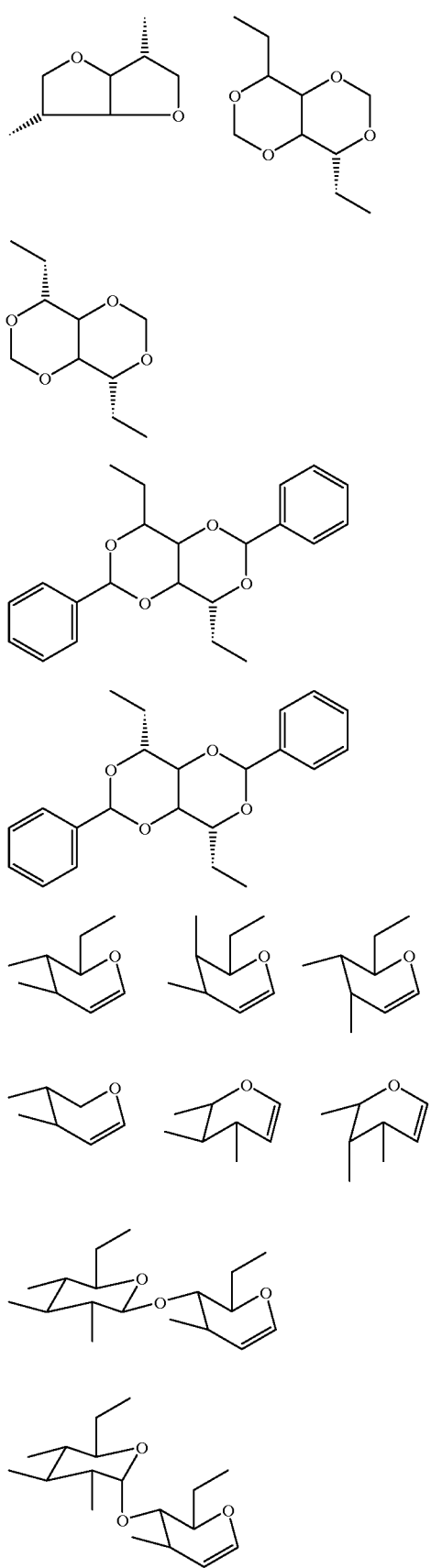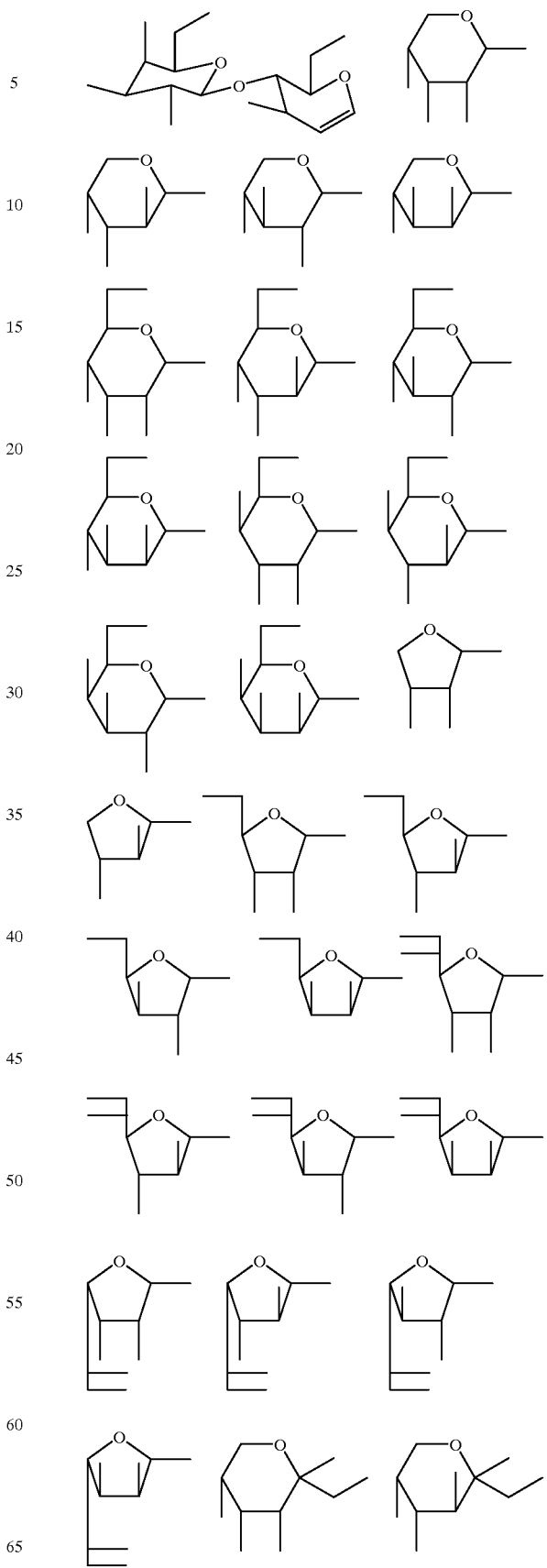

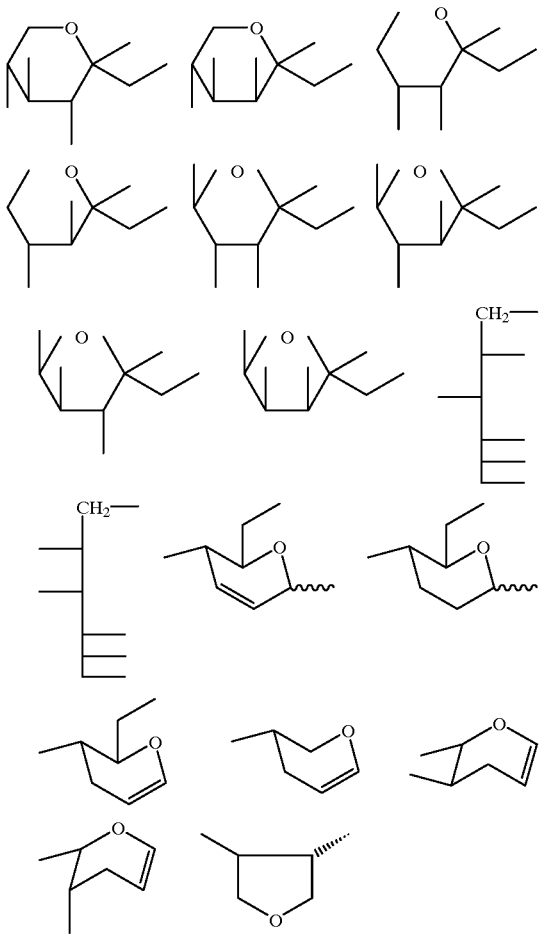

Particular preference is given to

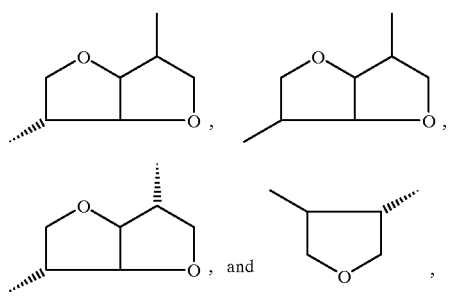

Also suitable are chiral compounds having the following structures:

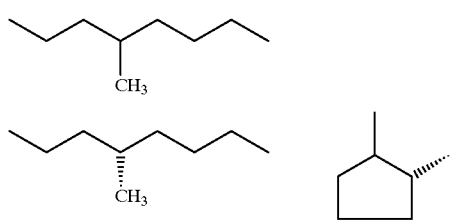

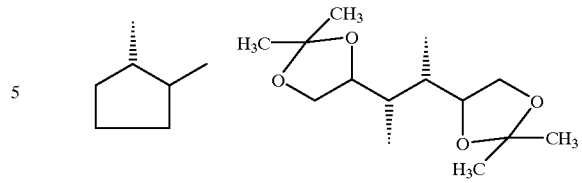

Further examples are recited in German Application P 43 42 280.2.

R can be methyl, ethyl, n-propyl, isopropyl, n-butyl, isobutyl, sec-butyl or tert-butyl as well as hydrogen.

n is preferably 2.

Of the achiral liquid crystalline polymerizable monomers mentioned under b), those are particularly suitable for the cholesteric liquid crystalline composition which have the general formula II $$Z^2-Y^4-A^2-Y^5-M^2-Y^6-A^3-Y^7-Z^3 \qquad \text{II}$$

where $Z^2$ and $Z^3$ are polymerizable groups or radicals containing a polymerizable group, $Y^4$, $Y^5$, $Y^6$ and $Y^7$ are each a chemical bond, oxygen, sulfur —CO—O—,—O—CO—,—O—CO—O—, —CO—N(R)— or —N(R)—CO—.

Here the polymerizable groups, the bridge members $Y^4$ to $Y^7$, the spacers and the mesogenic group are subject to the same preference criteria as the corresponding variables in the general formula I.

As well as an achiral liquid crystalline monomer, the cholesteric liquid crystalline composition mentioned under b) comprises a chiral compound.

Preferred chiral compounds are those of the formula Ia

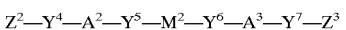

where $Z^1$, $Y^1$, $Y^2$, $Y^3$, $A^1$, X and n are each as defined above and $M^a$ is a bivalent radical which contains at least one hetero—or isocyclic ring system.

The moiety $M^a$ resembles the mesogenic groups described, since this ensures particularly good compatibility with the liquid crystalline compound. However, $M^a$ does not have to be mesogenic as such, since the only purpose of compound Ia is to bring about, through its chiral structure, a corresponding twisting of the liquid crystalline phase. Preferred ring systems present in $M^a$ are the abovementioned structures T.

The polymerization for preparing the pigment particles is preferably carried out photochemically. The light source depends on the nature of the polymerizable groups and also on the nature of any photoinitiator used. Any illuminants usable in polymer technology are suitable.

As well as by exposure to light, the polymerization of the polymerizable mixture can also be brought about by means of electron beams or else, depending on the polymerizable groups, thermally.

After polymerization, the pigment particles can be isolated by various methods, for example by pulling the nets purely mechanically over a sharp edge, in which case the pigment particles fall out of the openings. In addition, compressed air, water or ultrasound can be used for separating pigment particles and substrate.

The pigment particles prepared by the process of this invention can have various shapes and sizes. A platelet structure is advantageous especially for pigments whose coloring effect is based on interference. With these pigments, the perceived color is dependent on the viewing angle. The platelet structure permits uniform orientation of the pigment particles in the colored layer, giving rise to homogeneous reflection at many pigment particles and leading to a homogeneous color.

A particular advantage of the process of this invention is the possibility to prepare pigment platelets of identical shape and size. As a result of the identical shape, the pigments of this invention, especially the interference pigments, exhibit a particularly brilliant color.

The pigments of this invention are useful as coloring constituents of coating compositions such as printing inks, emulsion paints and gloss paints. Such coating compositions may comprise further customary additives. Suitable additives are mentioned for example in prior German Patent Application 19532419.6, incorporated herein by reference. Coatings comprising the pigments of this invention are particularly suitable for coating manufactured articles, especially vehicles such as automobiles, motor cycles, etc.

In the Examples which follow, parts and percentages are by weight, unless otherwise stated.

shape of the particles having an edge length of 160 μm. The particles exhibit a uniform green color in polarized light.

EXAMPLE 2

A screen printing net from Estal (Estal MONO 51T) is filled with an isotropic solution of

| 53.8 g | of mixture A, |
|---|---|
| 3.4 g | of compound B, |
| 0.5 g | of cellulose acetobutyrate, |
| 40.0 g | of butyl acetate and |
| 2.3 g | of compound C. |

The butyl acetate solvent is evaporated off and the liquid crystalline film remaining behind in the screen is irradiated for 2 minutes under a UV laboratory lamp (220 V, 320 watt) in an atmosphere of nitrogen. The cured film is subsequently broken out of the screen printing fabric. Microscopic examination of the resulting particles reveals a uniform square shape of the particles having an edge length of 120 μm. The thickness of the particles was 40 μm. The particles exhibit a uniform green color in polarized light.

Mixture A

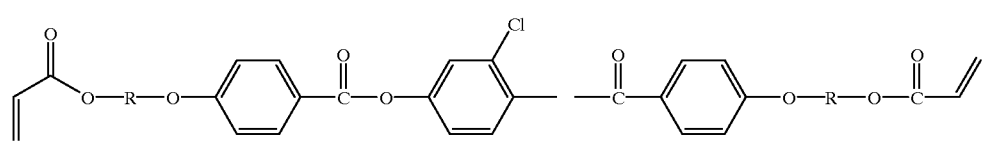

R: $C_2H_4$, $C_4H_8$, $C_6H_{12}$ } random distribution ~ 1 : 1 : 1

Compound B

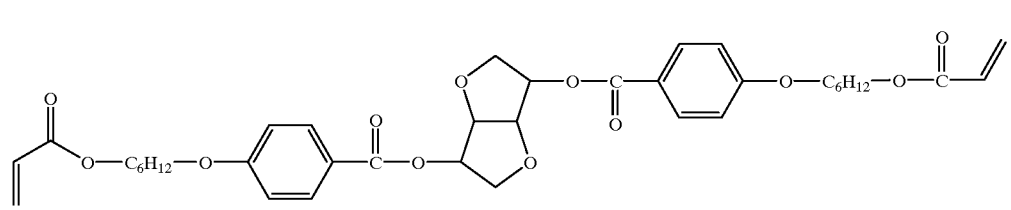

Compound C

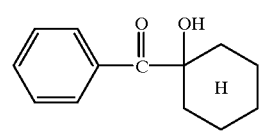

EXAMPLE 1

A screen printing net from Estal (Estal MONO 40T) is filled with an isotropic solution of

| 53.8 g | of mixture A, |
|---|---|
| 3.4 g | of compound B, |
| 0.5 g | of cellulose acetobutyrate, |
| 40.0 g | of butyl acetate and |
| 2.0 g | of compound C. |

The butyl acetate solvent is evaporated off and the liquid crystalline film remaining behind in the screen is irradiated for 2 minutes under a UV laboratory lamp (220 V, 320 watt) in an atmosphere of nitrogen. The cured film is subsequently broken out of the screen printing fabric. Microscopic examination of the resulting particles reveals a uniform square

EXAMPLE 3

A screen printing net from Estal (Estal MONO 55TX) is filled with an isotropic solution of

| 53.8 g | of mixture A, |
|---|---|
| 3.4 g | of compound B, |
| 0.5 g | of cellulose acetobutyrate, |
| 40.0 g | of butyl acetate and |
| 2.3 g | of compound C. |

The butyl acetate solvent is evaporated off and the liquid crystalline film remaining behind in the screen is irradiated for 2 minutes under a UV laboratory lamp (220 V, 320 watt) in an atmosphere of nitrogen. The cured film is subsequently broken out of the screen printing fabric. Microscopic examination of the resulting particles reveals a uniform square shape of the particles having an edge length of 120 µm. The thickness of the particles was 40 µm. The particles exhibit a uniform green color in polarized light.

We claim:

1. A process for preparing pigment particles of defined size and shape, which comprises treating a sheetlike structure having through openings of defined shape and size with a polymerizable substance or mixture of substances in such a way that the openings are filled, removing any solvent present, polymerizing the substance or substance mixture, and isolating the resulting pigment particles from the openings.

2. A process as claimed in claim 1, wherein the sheetlike structure used is a net composed of polymer or metal.

3. A process as claimed in claim 2, wherein the net used is composed of polyolefin, polyamide, polyester, fluorinated polyolefin or metal.

4. A process as claimed in claim 3, wherein the net used is suitable for screen printing.

5. A process as claimed in claim 1, wherein the polymerizable substance used is a liquid crystalline compound or dye having polymerizable groups or liquid crystalline compound or dye combined with a polymerizable binder.

6. A process as claimed in claim 5, wherein the liquid crystalline compound used is a cholesteric liquid crystalline compound or a nematic liquid crystalline compound doped with a chiral compound.

7. A process as claimed in claim 5, wherein photochemically polymerizable compounds are used.

8. A process as claimed in claim 1, further comprising treating the sheetlike structure with an agent for facilitating the isolation of the pigment particles from the through openings prior to the treatment with the polymerizable substances.

* * * * *